United States Patent [19]

Barrett et al.

[11] 3,801,147
[45] Apr. 2, 1974

[54] SHOCK ABSORBING BUMPER

[76] Inventors: Cedric A. Barrett, 662 Manhattan, S.E., Grand Rapids, Mich. 49506; John P. Kingsbury, 31 College N.E., Grand Rapids, Mich. 49503

[22] Filed: Nov. 26, 1971

[21] Appl. No.: 202,242

[52] U.S. Cl. ................ 293/9, 293/73, 188/301
[51] Int. Cl. ............................................ B60r 19/06
[58] Field of Search ............ 180/91, 92, 93, 94, 95, 180/96, 97; 188/301; 267/65 C, 116, 139; 293/DIG. 2, 9, 73, 85, 86

[56] References Cited
UNITED STATES PATENTS

| 1,618,036 | 2/1927 | Wilson et al. | 188/301 |
| 2,823,915 | 2/1958 | DeCarbon | 267/8 |
| 2,090,659 | 8/1937 | Zirmer et al. | 293/55 |
| 1,843,902 | 2/1932 | Ridge | 180/92 |
| 3,346,292 | 10/1967 | Lundman | 293/9 |

Primary Examiner—Gerald M. Forlenza
Assistant Examiner—Robert Saifer
Attorney, Agent, or Firm—Miller, Morriss, Pappas & McLeod

[57] ABSTRACT

A pneumatic, vacuum return shock absorption device and more specifically a shock absorbing bumper useful as a front and/or rear bumper for motor vehicles and motor boats and the like in which an air cylinder provides a cushion to shock applied to the piston of the cylinder and is vented to atmosphere on the high pressure side, the vent providing a selected resistance and a vacuum connection attached to a vacuum source in the vehicle whereby the piston and bumper are restored to regular position after the shock.

4 Claims, 5 Drawing Figures

PATENTED APR 2 1974 3,801,147

INVENTORS
CEDRIC A. BARRETT
JOHN P. KINGSBURY
BY
Miller Morris Pappas & McLeod
ATTORNEYS

SHOCK ABSORBING BUMPER

The present invention comprises a shock absorbing device and more particularly a rebound preventing absorption cushion for bumpers and the like relying on air pressure in a cylinder to vent to atmosphere at a selected pressure setting and a restoration means which is vacuum actuated by the motor of the vehicle to restore the cylinder and piston within it to starting position after absorption of the shock load.

Prior art devices such as seen in U.S. letters Pat. No. 3,399,919 to Brunt and U.S. Pat. No. 2,977,146 to Edwards both show the use of shock absorbing cylinders but both rely on hydraulic or pressurization restoration of the piston and hence in the process of shock absorption cause considerable rebound or bounce which is detrimental to human life and to the vehicle parts. The Resiliently Mounted Bumper for Vehicles of J. R. Omps in U.S. Pat. No. 2,873,994 shows an attempt with springs in combination with air cylinders to dampen the rebound. In U.S. Pat. No. 1,373,822 to Kleine a preloaded reservoir or tank stores energy and thereby restores the bumper to its original position. This device obviously includes high response or rebound. The cylinders are vented only on the return stroke.

With the prior art in mind, the principal object of the present invention is to provide an energy absorbing system which is relatively rebound free in its selected operating range and in which restoration of the pistons to operative position is provided by the vehicle motor from the vacuum manifold in automobiles. Another object is to provide a shock absorbing structure venting to atmosphere at a fixed or adjustable rate. On return the piston is moved by engine generated vacuum and the high pressure side of the piston is opened to generate restoring pressures. Plural of the cylinders herein can be used and manifolded together but more economically each cylinder can be vented independently and may each be served by vacuum lines from a common vacuum source.

Other objects including simplicity, economy and adaptability to a wide range of bumper and vehicle designs will be apparent to those skilled in the art as the description proceeds.

In the Drawings

General Description

The shock absorbing device as set forth in the present invention is primarily concerned with improving the operation of shock absorbing bumpers. At least one pneumatic cylinder is provided which is attached to the bumper of a car by means of a piston rod or an extension thereof. The piston rod is connected to a piston inside the cylinder. The cylinder is of the double-acting type. The extension end of the cylinder is provided with a vacuum port and the port is connected to a suitable source of vacuum such as to the vacuum manifold in an automobile.

As will be seen, vacuum urges full extension of the piston and the bumper is thus always extended preparatory to receiving impact shock. As long as the engine or motor works to generate the vacuum, the bumper is extended and is ready to sustain shock. Two valves are provided in the end of the cylinder opposite the piston end. One of these is a check valve preventing flow from inside the cylinder to the atmosphere, but freely admitting atmospheric pressure when the atmospheric pressure is at or above the cylinder pressure. The other valve is a relief valve of the fixed or variable type, set to release at a selected pressure and to hold that pressure through the remainder of a stroke of the piston after gas compression achieves the release threshold. Hence, the object of the relief valve vented to atmosphere is to maintain a relatively constant resistance to movement of the piston after an initial compression movement of the piston on impact to raise the cylinder pressure to the relief valve threshold.

The set pressure can be selected in accord with the resistance sought, the impacts to be resisted and the stroke requirements of the cylinders. The result is a substantially flat reaction with very little rebound tendency in the cylinder because the air is being vented and the only restoration pressure is the set pressure of the relief valve, which immediately drops as the shock pressure is removed. Restoration of the piston and bumper occurs when the shock pressure is removed and by action of the vacuum drawing the piston outwardly and in restoration of bumper position.

By providing a clevis mount operating in a slot in one of the piston rods and a pivotal connection on the other, the bumpers may be impacted at an angle to the line of travel and each of the cylinders will handle that vector of force applicable to it by an angular impact. Since the cylinders are separated the pressures and movement in a cylinder need not equal the movement in the other and the present system is rendered substantially more versatile in shock absorption. The present invention complements the concept of equal height and mating bumpers and boot covers are provided protecting the piston rods from weather and road debris.

SPECIFIC DESCRIPTION

Figure 1:
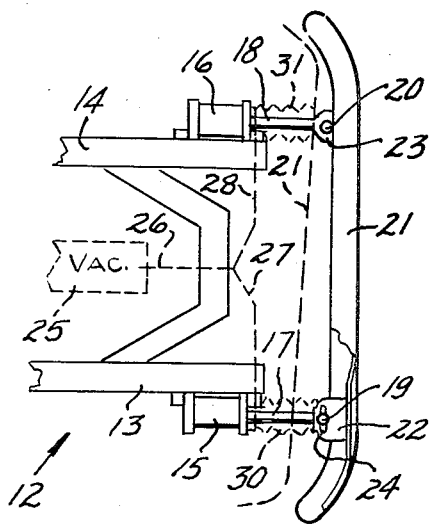
FIG. 1 is a top plan view, somewhat schematic, of a vehicle frame to which a bumper and cylinders in accord with the present invention have been operably secured. The motor is indicated and vacuum lines to the cylinders are shown from the vacuum manifold of the motor.
Figure 5:
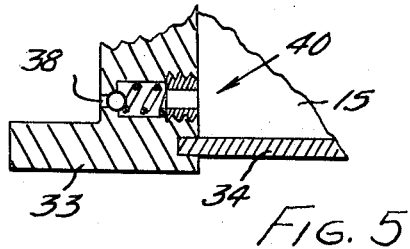
FIG. 5 is a partial section elevation view taken on the line V—V of FIG. 3 and showing the check valve allowing atmospheric pressure to reach the piston during return movement of the piston.

Referring to the drawing and with particularity to FIG. 1 thereof, the present invention is illustrated mounted on the front end of a vehicle. The vehicle position is appreciated by reference to the vehicle frame 12. The side elements 13 and 14 of the frame 12 provide a firm mounting means for the pneumatic cylinders 15 and 16. Extending from the cylinders 15 and 16 are piston rods 17 and 18 respectively, and the outboard terminal ends of the piston rods 17 and 18 are pivotally connected at pivots 19 and 20 to the bumper 21 as by bracket supports 22 and 23, respectively. The bracket 22 is provided with a slot 24 which allows lineal displacement of the pivot 19 in respect thereto so as to compensate for an impact which may be angularly applied to the bumper 21 and giving rise to differential movement of the piston rods 17 and 18 as suggested by the phantom line position of the bumper 21.

A vacuum source as the vacuum manifold 25 is connected by vacuum lines or tubes 26 to the outboard end of the cylinders 15 and 16. Leads 27 and 28 respectively, make the actual connections, as seen, with the cylinders, but other conduit arrangements well known in the art such as manifolding, individual lines and the like may be employed. The important point, as will be seen, is that the source of vacuum 25 acts on the cylinders 15 and 16 to urge full extension of the piston rods 17 and 18 and the attached bumper 21. This is operative so long as the internal combustion engine powering the vehicle provides or generates the needed vacuum. As will be seen, this vacuum merely operates to extend and return or restore the extended position of the bumper 21. It is a negligible force in resisting impact forces. The boots 30 illustrated schematically assure that the piston rods and cylinder bearings are kept free from road dirt and the like. Such boots 30 are well known in protection of reciprocating parts.

Figure 2:
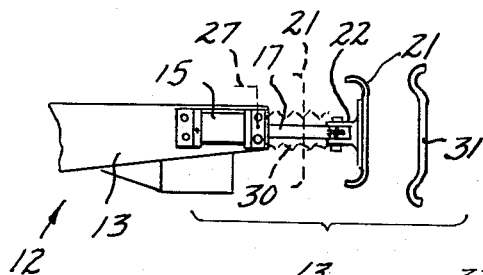
FIG. 2 is a side elevation view of the structure seen in FIG. 1 and showing the cylinder of the present invention secured to the frame and the bumper interconnected by means of a piston rod. In this figure the mating configuration as between front and rear bumpers are indicated.

In FIG. 2 the arrangement as shown in FIG. 1 is better appreciated from the side elevation view and the depressed position of the bumper 21 in phantom line is better illustrated. Additionally, the rear bumper 31 is shown, shaped to accommodate nesting contact with the bumper 21. It will also be appreciated that the rear bumper 31 of the vehicle (not shown) may be attached to cylinders such as 15 and 16 to provide rear shock absorption. The vacuum line 27 runs to the source of vacuum 25 as seen in FIG. 1.

Figure 3:
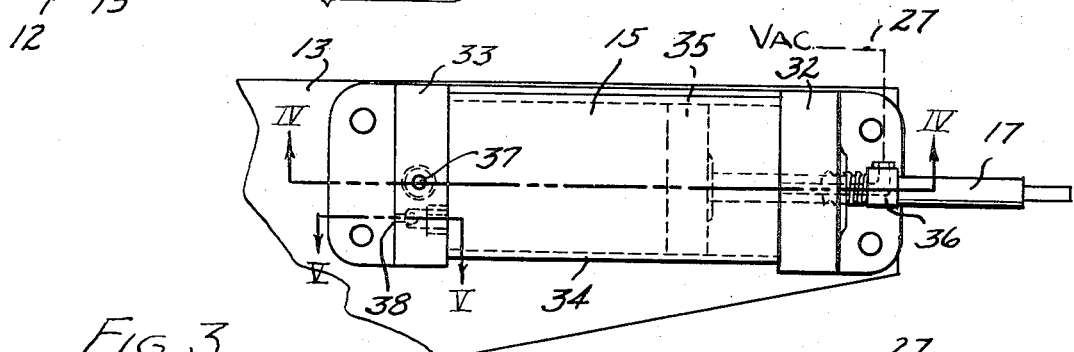
FIG. 3 is a side elevation view of a cylinder in accord with the present invention disconnected from the bumper and frame.
Figure 4:
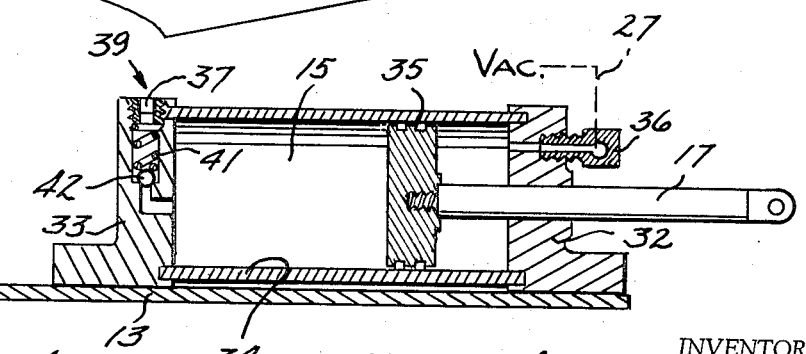
FIG. 4 is a full section elevation view taken on the line IV—IV of FIG. 3 and showing the relief valve built into the double acting cylinder and vented to atmosphere and also indicating the vacuum port whereby the piston is restored to full extension.

In FIG. 3 the cylinder 15, typical of cylinder 15 or 16, is shown mounted and secured to the vehicle frame 13 as by bolts, welding or other satisfactory means. The end caps 32 and 33 are seen in coaxial support of the intermediate cylinder body or tube 34. The piston rod 17 axially extends from the end cap 32 and a piston 35 is secured to the end thereof inside the cylinder 15. Hence, as the piston 35 moves the piston rod 17 is correspondingly extended or retracted. Since the cylinder is of the double acting type the front connection through end cap 32 includes a fitting 36 which is connected to the vacuum tube 27 and communicates into the cylinder 15. This arrangement assures that the vacuum applied to the piston 35 will tend to constantly urge the piston 17 outwardly.

The rear end cap 33 is provided with two openings 37 and 38. The opening 37 is served by the relief valve 39 and the opening 38 is served by the check valve 40. When pressure in the cylinder 15 is below atmospheric, as when the piston 35 is extending the rod 17, then the check valve 40 is open assisting the vacuum applied to the front side of the piston 35 and allowing full extension. The relief valve 39 is orificial but may be adjustable as shown, the compression in the spring 41 acting on the ball 42 providing a pressure relief point when conditions in the cylinder 15 exceed the set point. In this function, the check valve 40 is closed and the relief valve 39 opens upon suitable compression of the air in the cylinder 15. The compression of the air provides a first shock support and then the relief of the air to atmosphere assures a constant pressure bias over the balance of the stroke of the piston 35 with no rebound tendencies. To the extent that residual compressed gases are in the cylinder 15, the restoration of the piston 35 is partially accomplished without the vacuum but the application of the vacuum restores the extended piston rod 17 and its associated bumper 21 as seen in FIG. 1.

Additional cylinders as 15 and 16 and otherwise served by vacuum and venting as described may be connected to the bumper 21 as needed and the cylinders may be mounted for limited pivoting as necessary against side impact.

As will be appreciated, bearings, size of cylinders, stroke, and valve settings are matters of choice matching the selected requirements of a bumper system as adopted to any particular vehicle and particular impact requirements. In barrier testing vehicles equipped as described herein have sustained shocks to about 15 miles per hour with excellent shock absorption and with minimal damage and rebound.

Having thus described our invention and an operative embodiment thereof, others skilled in the art will perceive obvious improvements and modifications and such improvements and modifications are intended to be included herein limited only by the scope of our hereinafter included claims.

We claim:

1. A shock absorbing bumper comprising:
   a bumper;
   at least one piston rod secured to said bumper for movement therewith;
   a cylinder aligned axially with each of said piston rods and containing a piston to which said piston rod is connected;
   a vacuum port through said cylinder on said piston rod side of said cylinder;
   a relief valve venting to atmosphere at the end of said cylinder opposite said piston rod;
   a check valve at the same end of said cylinder as said relief valve permitting flow of air from atmosphere to said cylinder; and
   a source of vacuum connected to said vacuum port whereby said piston is urged normally toward said piston rod end of said cylinder when said source of vacuum is operating and projecting said bumper outward in accord with said vacuum.

2. A shock absorption device comprising:
   a pneumatic cylinder of the double-acting type;
   a piston in said cylinder;
   a piston rod connected to said piston and reciprocating with said piston;
   an impact receiving bumper member connected to said bumper member, rod externally of said cylinder;
   a check valve in said cylinder closed when pressure in said cylinder exceeds atmospheric and open when pressure in said cylinder is at or below atmospheric;
   a relief valve in said cylinder venting to atmosphere at selected pressure settings above atmospheric, said check valve and said relief valve both in the end of said cylinder opposite said piston rod;
   a vacuum port located in the end of said cylinder through which said piston rod extends; and a source of vacuum connected to said vacuum port and biasing said piston and said piston rod outwardly.

3. A shock absorption device of the pneumatic type comprising:
   a bumper element;
   at least one piston connected to said bumper element;
   a cylinder in which said piston is reciprocable;
   a relief valve in said cylinder at the end opposite the piston end thereof and opening at a preselected pressure on impact of said bumper;
   a check valve in said cylinder at the end opposite the piston end thereof opening said cylinder to atmospheric pressure on the return stroke of said piston;
   a vacuum port defined in said cylinder on the piston end thereof; and
   a source of vacuum connected to said port urging said piston and bumper element to a fully extended return position.

4. In the combination as set out in claim 3 wherein the relief valve is adjustable as to pressure setting.

* * * * *